United States Patent [19]

Sugawara et al.

[11] Patent Number: 5,160,923
[45] Date of Patent: Nov. 3, 1992

[54] PRIORITY ENCODER FOR RESOLVING PRIORITY CONTENTION

[75] Inventors: Akihiko Sugawara; Yoshihito Takahashi, both of Tokyo, Japan

[73] Assignee: NEC Corporation, Tokyo, Japan

[21] Appl. No.: 596,106

[22] Filed: Oct. 11, 1990

[30] Foreign Application Priority Data

Oct. 11, 1989 [JP] Japan .................................. 1-264776

[51] Int. Cl.[5] ............................................. G06F 13/18
[52] U.S. Cl. ............................ 340/825.51; 340/825.5; 370/85.6; 364/242.6; 364/230.1
[58] Field of Search .............. 364/200 MS; 340/825.5, 340/825.51; 370/85.6, 85.2, 85.4

[56] References Cited

U.S. PATENT DOCUMENTS

| | | | |
|---|---|---|---|
| 4,760,515 | 7/1988 | Malmquist et al. | 364/200 |
| 4,924,380 | 5/1990 | McKinney et al. | 364/200 |
| 5,038,346 | 8/1991 | Courtois | 340/825.5 |

*Primary Examiner*—Donald J. Yusko
*Assistant Examiner*—John Giust
*Attorney, Agent, or Firm*—Sughrue, Mion, Zinn, Macpeak & Seas

[57] ABSTRACT

A priority encoder, for determining one of a plurality of channels requesting service simultaneously, includes a selecting circuit provided between a channel determining circuit and a channel memory. The determining circuit selects one of channels to be served in a fixed priority mode or rotating priority mode and generates a next channel signal. The channel memory supplies a stored channel signal, which indicates a previously served channel, to the determining circuit for determining the one of channels in the rotating priority mode. The selecting circuit selects the stored channel signal in the fixed rotating mode and the next channel signal in the rotating priority mode, and supplies it to the channel memory. Owing to this structure, the last channel obtaining the service in the previous rotating priority mode is held in the channel memory until the priority encoder becomes the rotating priority mode followed by a temporary fixed priority mode.

7 Claims, 2 Drawing Sheets

PRIORITY ENCODER FOR RESOLVING PRIORITY CONTENTION

BACKGROUND OF THE INVENTION

The present invention relates to a priority encoder for resolving priority contention between channels requesting simultaneous service. More particularly, the present invention relates to a priority encoder capable of fixed priority encoding and rotating priority encoding.

A conventional priority encoder, the 8237A Programmable DMA Controller, is described at pages 2-222 through 2-240 of an October, 1987 Intel manual under the heading, "8237A HIGH PERFORMANCE PROGRAMMABLE DMA CONTROLLER". This priority encoder determines, according to a priority order, a peripheral circuit or channel which can obtain direct memory access (DMA) from system memory when a plurality of the system's peripheral circuits or channels simultaneously request a DMA service, i.e., when a priority contention occurs. When a peripheral circuit or channel obtains service, other peripheral circuits or channels having lower priority are prevented from interfering with the service until the service to the higher priority channel is completed.

Two types of priority encoding are available to the user of the priority encoder. The first is fixed priority encoding in which the one channel to obtain service is selected from a plurality of channels in a predetermined priority order. For instance, if there are first to fourth channels simultaneously requesting service, the first channel always has the highest priority, followed by the second and third channels, the fourth channel always has the lowest priority.

The second type for priority encoding is rotating priority encoding in which the last channel obtaining service becomes the lowest priority channel. In case of the rotating priority encoding, any channel requesting service will obtain service after service to not more than three higher priority channels are completed. This prevents any one channel from monopolizing the service.

When the conventional priority encoder changes its operating mode from the rotating priority mode for the rotating priority encoding to a fixed priority mode for the fixed priority encoding and then back into the rotating priority mode, the last channel obtaining service in the fixed priority mode, becomes the lowest priority channel and, therefore, the next lower priority channel in the fixed priority order to that last channel obtains service. For example, when the priority mode is changed from rotating to fixed after the third channel obtains service, the priority encoder grants the next service to the first channel which has the highest priority in the fixed priority mode. If the priority mode is then changed to the rotating priority mode after service to the first channel is completed, the priority encoder grants service to the second channel since the second channel has the highest priority after service to the first channel in the rotating priority mode.

Thus, the channel about to obtain service after the third channel in the rotating mode previous to the fixed mode, i.e., the fourth channel, cannot obtain service for a long period of time. Thus, the conventional priority encoder is disadvantageous in that bus latency of a particular channel may become long when the priority mode is changed.

SUMMARY OF THE INVENTION

An object of the present invention is to provide a priority encoder capable of providing, in a present rotating priority mode followed by a temporary fixed priority mode, service to the channel having the next lower priority to that of last channel granted service, in the previous rotating priority mode.

Another object of the present invention is to provide a priority encoder capable of reducing bus latency occurring when the priority mode is changed.

A priority encoder according to the present invention includes: determining means supplied with a plurality of request signals generated by a plurality of channels, a mode signal indicating a fixed priority mode or a rotating priority mode, and a stored channel signal indicating a previously serviced channel, the determining means for generating a next channel signal indicating one of a plurality of channels according to a fixed priority order irrespective of the stored channel signal when the mode signal indicates the fixed priority mode, and according to a rotating priority order with reference to the stored channel signal when the mode signal indicates the rotating priority mode; selecting means supplied with the next channel signal, the stored channel signal, and the mode signal for generating a selected channel signal, in which the selecting means output the next channel signal as the selected channel signal when the mode signal indicates the rotating priority mode, and output the stored channel signal as the selected channel signal when the mode signal indicates the fixed priority mode; and memory means for storing the selected channel signal and for supplying the selected channel signal to the determining means and the selecting means as the stored channel signal.

BRIEF DESCRIPTION OF THE DRAWINGS

In the drawings, like elements bear the same reference numerals.

DETAILED DESCRIPTION OF THE PREFERRED EMBODIMENT

In order to clarify the features of the present invention, the conventional priority encoder will be first described with reference to the drawings of FIGS. 1 and 2.

Figure 1:
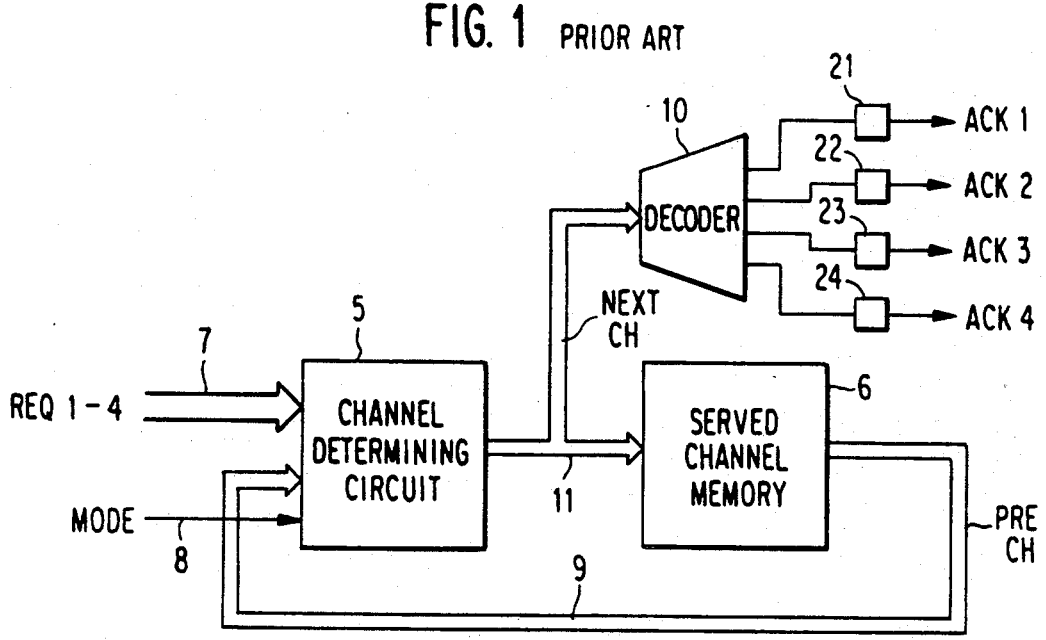
FIG. 1 is a block diagram of a conventional priority encoder.
Figure 2:
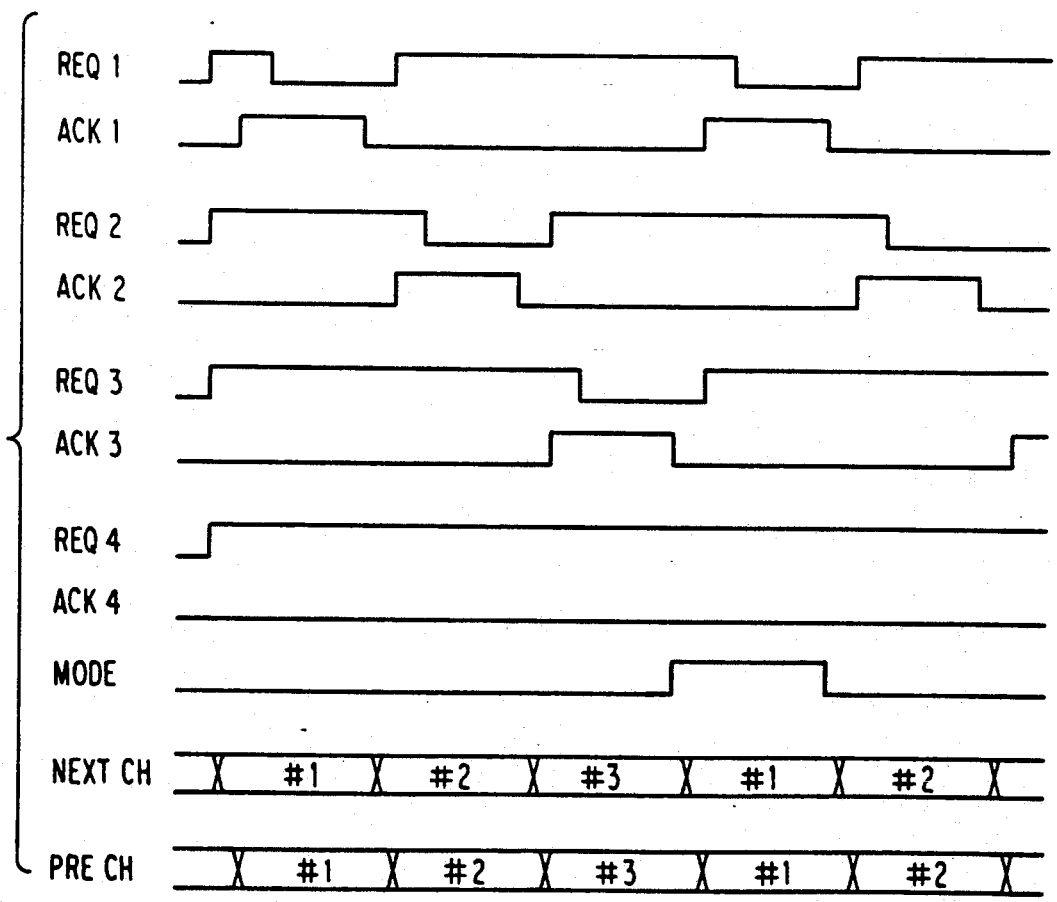
FIG. 2 is a timing chart showing an operation of the conventional priority encoder shown in FIG. 1.

Referring to FIG. 1, the conventional priority encoder includes a channel determining circuit 5 and a served channel memory 6. The determining circuit 5 is supplied with service request signals REQ 1-4 via lines (4 bit) 7, each of which is generated by a respective one of first to fourth peripheral circuits (not shown) included in first to fourth independent channels, respectively. The determining circuit 5 determines one of the channels, i.e., one of the peripheral circuits, to be served in reference to a priority mode signal MODE supplied via line 8 when more than two channels simultaneously request the service. The determining circuit 5 also refers to a previously served channel signal PRE CH, which will be referred to as "previous channel signal", supplied by the channel memory 6 via 2-bit line 9 when the mode signal MODE indicates a rotating priority mode.

The determining circuit 5 supplies the selected channel number as a next served channel signal NEXT CH, which will be referred to as "next channel signal", to the channel memory 6 and a decoder 10 via 2-bit line 11. The channel memory 6 stores the next channel signal NEXT CH until a new channel number is supplied, and then supplies it to the determining circuit 5 as the previous channel signal PRE CH. The decoder 10 decodes the next channel signal NEXT CH to activate one of the monostable multivibrators 21–24 to generate one of acknowledge signals ACK 1–4 used to grant service to the first to fourth channels or peripheral circuits, respectively.

When the mode signal, MODE, indicates a fixed priority mode and more than two channels request the service, the determining circuit 5 selects one channel based upon the fixed priority order. This means that, when more than two channels request service, the highest priority channel requesting service obtains service after service to any one channel is completed. For instance, even after service to the first channel (the highest priority channel) is completed, the first channel obtains the service again if the first channel requests the next service. Although the next channel signal NEXT CH is stored to the channel memory 6 and supplied to the determining circuit 5 as the previous channel signal PRE CH in the fixed priority mode, the previous channel signal PRE CH is not used by the determining circuit 5 to determine the next channel to be served.

When the mode signal MODE indicates a rotating priority mode, the determining circuit 5 selects one channel based on a rotating priority order in which the last channel having been served becomes the lowest priority channel. To this end, the previous channel signal PRE CH is supplied to the determining circuit 5. For instance, when the first and second channels request the service, the determining circuit 5 selects the first channel first, and supplies the channel number (=#1) to the memory 6. When the service to the first channel is completed, the channel number (=#1) is supplied to the determining circuit 5 as the previous channel signal PRE CH. Therefore, to the circuit 5, the first channel becomes the lowest priority channel so as to select the second channel next even if the first channel requests next service.

Description now will be made, with reference to FIG. 2, of the case where the conventional priority encoder operates under the rotating priority mode, and then temporarily operates under the fixed priority mode, and then operates under the rotating priority mode again, when the first to fourth channels continuously request service.

Initially, the mode signal MODE is "low" which indicates the rotating priority mode. When the first to fourth channels simultaneously request service, i.e., request signals REQ 1–4 are "high", the determining circuit 5 first selects the first channel, and supplies this signal as the next channel signal NEXT CH to the decoder 10 and the memory 6. The decoder 10 decodes the channel signal NEXT CH (=#1) and activates the multivibrator 21 to generate the acknowledge signal ACK 1. Thus, the first channel obtains service so that the first peripheral circuit can carry out a desired operation, such as DMA operation. The memory 6 stores the next channel signal NEXT CH and supplies it to the determining circuit 5 as the previous channel signal PRE CH via the line 9.

After service to the first channel has been completed, the determining circuit 5 next selects the second channel, since the circuit 5 recognizes that the first channel becomes the lowest priority channel in reference to the previous channel signal PRE CH (=#1) and the second channel becomes the highest priority channel at this time. The acknowledge signal ACK 2 is then generated by the decoder 10 and miltivibrator 22 and the next channel signal NEXT CH (=#2) is stored in the memory 6. Similarly, the determining circuit 5 selects the third channel after service to the second channel has been completed.

If the mode signal, MODE, goes "high", to indicate the fixed priority mode, after the third channel obtains service, the determining circuit 5 selects the first channel after service to the third channel has been completed. This is because the first channel always has the highest priority in the fixed priority mode. In this instance, the previous channel signal PRE CH (=#3) from the memory 6 is not used to determine the next channel to be served. The next channel signal NEXT CH (=#1) is supplied to the decoder 10 so as to generate the acknowledge signal ACK 1, and to the memory 6.

If the mode signal, MODE, goes "low" after the first channel obtains service, the determining circuit 5 returns to the rotating priority mode. Since memory 6 supplies the previous channel signal PRE CH (=#1), indicating the first channel, the determining circuit 5 will next select the second channel in the returned to rotating priority mode. The third channel will be selected next in this mode. Therefore, the fourth channel, which has been requesting service, cannot obtain the service for a long period of time.

An embodiment of the prevent invention will now be described.

Figure 3:
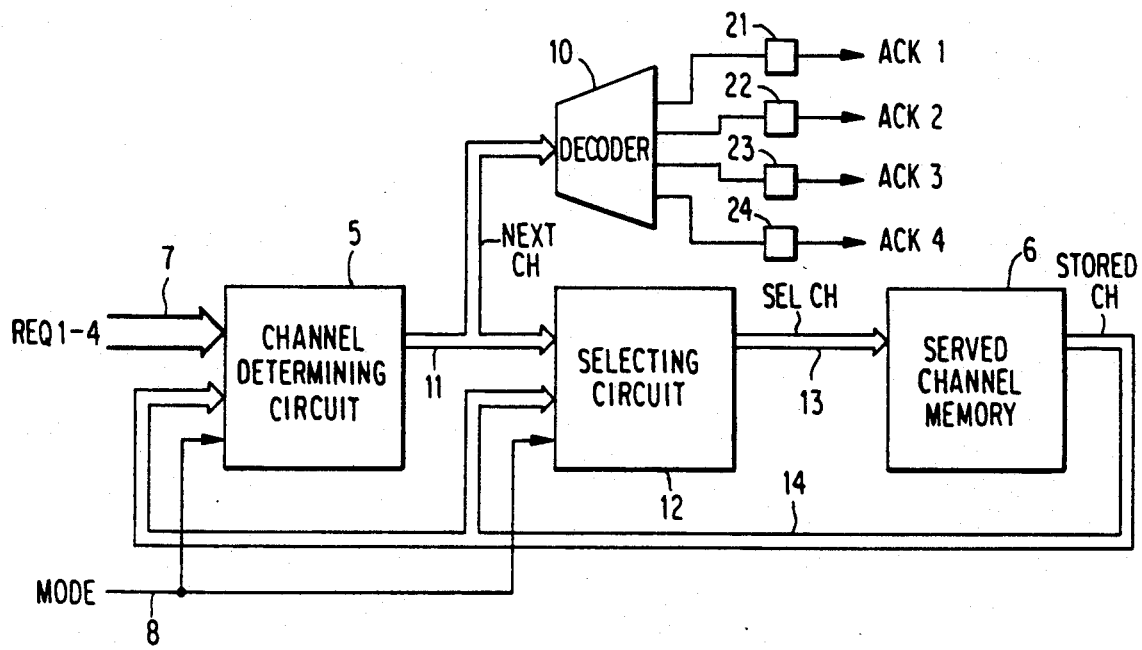
FIG. 3 is a block diagram of an embodiment of the present invention.

Referring to FIG. 3, a priority encoder according to an embodiment of the present invention includes a channel determining circuit 5, served channel memory 6 and decoder 10, which elements function substantially the same as the corresponding elements of the conventional priority encoder shown in FIG. 1. The priority encoder of the invention further includes a selecting circuit 12 provided between the determining circuit 5 and memory 6.

The selecting circuit 12 is supplied with a next channel signal NEXT CH from the determining circuit 5 via 2-bit line 11, a stored channel signal STORED CH from the memory 6 via 2-bit line 14, and a mode signal MODE so as to be able to supply a selected channel signal SEL CH to the memory 6 over line 13. When the mode signal, MODE, is "low", to indicate the rotating priority mode, the selecting circuit 12 selects the next channel signal NEXT CH and supplies it to the memory 6 as the selected channel signal SEL CH. When the mode signal, MODE, is "high", which indicates the fixed priority mode, the selecting circuit 12 selects the stored channel signal STORED CH and supplies it to the memory 6 as the selected channel signal SEL CH. The memory 6 stores the selected channel signal SEL CH until the next input is supplied, and supplies it to the determining circuit 5 and selecting circuit 12 as the stored channel signal, STORED CH, via 2-bit line 14.

Operation of the priority encoder of the invention will be described under the same as that described with reference to FIG. 2.

Figure 4:
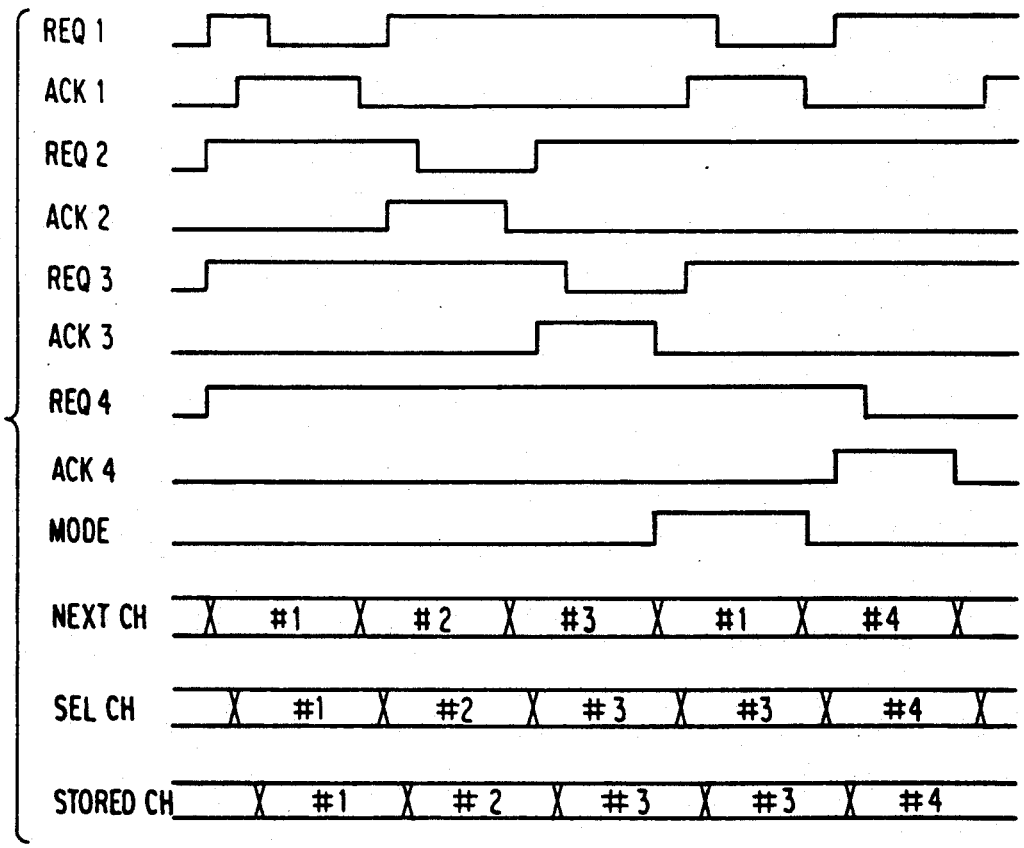
FIG. 4 is a timing chart showing an operation of the embodiment of the present invention shown in FIG. 3.

Referring to FIG. 4, when the request signals REQ 1-4 simultaneously turn "high", the determining circuit 5 selects the first channel, first, so as to supply the next channel signal NEXT CH (=#1) to the decoder 10 and the selecting circuit 12. The decoder 10 activates the multivibrator 21 to generate the acknowledge signal ACK 1. Since the mode signal, MODE, is "low", which indicates the rotating priority mode, the selecting circuit 12 selects the next channel signal NEXT CH (=#1) and supplies it to the memory 6 as the selected channel signal SEL CH. The memory 6 stores the selected channel signal SEL CH (=#1).

When service to the first channel is completed, the determining circuit 5 selects the second channel to generate the next channel signal NEXT CH (=#2) since the mode signal, MODE, is "low" and the stored channel signal STORED CH from the memory indicates the first channel (=#1). The decoder 10 and multivibrator 22 produce the acknowledge signal ACK 2. The selecting circuit 12 selects the next channel signal NEXT CH (=#2), rather than the stored channel signal STORED CH, to be stored in the memory 6. Similarly, when service to the second channel is completed, the determining circuit 5 selects the third channel, causing the decoder 10 and multivibrator 23 to produce the acknowledge signal, ACK 3, and the selecting circuit 12 to supply the selected channel signal SEL CH (=#3) to the memory 6.

When the mode signal, MODE, goes "high", to indicate the fixed priority mode, and after service to the third channel is completed, the determining circuit 5 selects the first channel since the first channel has the highest priority in the fixed priority mode. The next channel signal NEXT CH is supplied to the decoder 10 to generate the acknowledge signal ACK 1 and to the selecting circuit 12. The selecting circuit 12, however, selects the stored channel signal STORED CH (=#3) supplied by the memory 6, and supplies it to the memory 6 as the selected channel signal SEL CH since the mode signal, MODE, is "high". Thus, the selected channel signal SEL CH (=#3) is again stored in the memory 6. This means that the number of the last channel obtaining the service in the rotating priority mode is held in the memory 6 during the fixed priority mode.

If the mode signal goes "low" after the first channel obtains service, and after service to the first channel is completed, the determining circuit 5 can select the fourth channel since the stored channel signal STORED CH indicates the third channel (=#3) and the fourth channel has the highest priority after service to the third channel is completed in the rotating priority mode. Thus, the determining circuit 5 generates as the next channel signal NEXT CH (=#4) so as to produce the acknowledge signal ACK 4. Therefore, the fourth channel obtains service so that the fourth peripheral circuit can carry out a desired operation within a reasonable period of time after it has requested service.

As described above, the present invention makes it possible to reduce bus latency of a particular channel even when the priority mode is temporarily changed since the last channel obtaining service in the previous rotating priority mode is held in the stored channel memory until the next rotating priority mode following a temporary fixed priority mode.

What is claimed is:

1. A priority encoder for determining one of a plurality of channels to be served, comprising:
    determining means for receiving a plurality of request signals generated by said plurality of channels, a mode signal indicating one of a fixed priority mode and a rotating priority mode, and a stored channel signal indicating a previously served channel, said determining means for generating a next channel signal indicating one of said plurality of channels according to a fixed priority order independently of said stored channel signal when said mode signal indicates said fixed priority mode, and according to a rotating priority order in reference to said stored channel signal when said mode signal indicates said rotating priority mode;
    selecting means for receiving said next channel signal, said stored channel signal, and said mode signal, said selecting means for generating as a selected channel signal said next channel signal when said mode signal indicates said rotating priority mode, and said stored channel signal when said mode signal indicates said fixed priority mode; and
    memory means for storing said selected channel signal and for supplying said selected channel signal to said determining means and said selecting means as said stored channel signal whereby said priority encoder prevents bus latency of one of said plurality of channels when said mode signal indicates from said rotating priority mode to said fixed priority mode and then to said rotating priority mode.

2. The priority encoder as claimed in claim 1, further comprising decoder means for decoding said next channel signal to produce an acknowledge signal to said one of said plurality of channels.

3. The priority encoder as claimed in claim 2, further comprising a plurality of monostable multivibrators activated by said decoder means for generating said acknowledge signal for a predetermined period of time.

4. The priority encoder as claimed in claim 1, wherein the number of said plurality of channels is four.

5. A priority encoder for determining one of a plurality of channels to be served, comprising:
    determining means for receiving a plurality of request signals generated by a plurality of said channels and a stored channel signal indicating a previously served channel, said determining means for determining one of said channels based on a fixed order independently of said stored channel signal in a fixed priority mode or a rotating order related to said stored channel signal in a rotating priority mode; and
    means for storing the channel number of the last served channel in a preceding rotating priority mode, during said fixed priority mode which follows said preceding rotating priority mode, and for supplying said stored channel number to said determining means as said stored channel signal whereby said priority encoder prevents bus latency of one of said plurality of channels when said mode signal indicates from said rotating priority mode to said fixed priority mode and then to said rotating priority mode.

6. A method for determining one channel to be served among a plurality of channels, comprising the steps of:
    storing a selected channel signal, which indicates a previously served channel, as a stored channel signal;
    determining one channel to be served in response to a plurality of request signals generated by a plurality of said channels, based on a fixed priority order in a fixed priority mode, or in response to a plurality of said request signals and said stored channel signals based on a rotating priority order in a rotating priority mode;

generating a next channel signal indicating said one channel to be served; and selecting said stored channel signal as said selected channel signal in said fixed priority mode, and said next channel signal as said selected channel signal in said rotating priority mode whereby said method prevents bus latency of one of said plurality of channels when a priority mode is changed from said rotating priority mode to said fixed priority mode and then to said rotating priority mode.

7. The method as claimed in claim 6, further comprising the step of encoding said next channel signal to generate an acknowledge signal applied to said one channel to be served.

* * * * *